United States Patent
Pawlowski et al.

(10) Patent No.: US 6,195,712 B1
(45) Date of Patent: Feb. 27, 2001

(54) DYNAMIC DISCOVERY OF WIRELESS PERIPHERALS

(75) Inventors: Stephen S. Pawlowski; Mohan Kumar, both of Beaverton; David E. Ackelson, Banks, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/874,297

(22) Filed: Jun. 13, 1997

(51) Int. Cl.[7] .................................................. G06F 13/14
(52) U.S. Cl. ........................... 710/19; 710/101; 345/156; 370/347; 375/295; 455/66
(58) Field of Search ........................ 370/347; 375/295; 710/101, 19; 345/156; 455/66

(56) References Cited

U.S. PATENT DOCUMENTS

| | | | |
|---|---|---|---|
| 4,439,856 | * | 3/1984 | Ulig ........................................ 370/85 |
| 4,594,705 | * | 6/1986 | Yahata et al. ........................... 370/67 |
| 5,189,543 | * | 2/1993 | Lin et al. ................................ 359/142 |
| 5,297,268 | * | 3/1994 | Lee et al. ............................... 395/425 |
| 5,317,693 | * | 5/1994 | Cuenod et al. ....................... 395/275 |
| 5,422,887 | * | 6/1995 | Diepstraten .......................... 370/85.3 |
| 5,600,105 | * | 2/1997 | Fukuzaki et al. ....................... 178/19 |
| 5,623,610 | * | 4/1997 | Knoll et al. ........................... 395/281 |
| 5,652,766 | * | 7/1997 | Matsumura et al. ................. 375/295 |
| 5,682,379 | * | 10/1997 | Mahany et al. ...................... 370/311 |
| 5,699,357 | * | 12/1997 | Carvey ................................. 370/347 |
| 5,809,067 | * | 9/1998 | Funk et al. ........................... 375/222 |
| 5,862,452 | * | 1/1999 | Cudak et al. .......................... 455/6.3 |
| 5,864,708 | * | 1/1999 | Croft et al. ............................ 395/821 |
| 5,877,745 | * | 3/1999 | Beeteson et al. .................... 345/156 |
| 5,881,366 | * | 3/1999 | Bodenmann et al. ................. 455/66 |

FOREIGN PATENT DOCUMENTS 62-038959 * 8/1988 (JP) .

* cited by examiner

*Primary Examiner*—Thomas C. Lee
*Assistant Examiner*—Abdelmoniem Elamin
(74) *Attorney, Agent, or Firm*—Kenyon & Kenyon

(57) ABSTRACT

A "Plug and Play" type dynamic detection and binding capability for wireless peripheral devices is disclosed. The dynamic detection and binding of wireless peripherals is achieved without manual intervention, and without modifications to the host computing device's built-in operating system (BIOS).

Dynamic detection and binding of a wireless peripheral device by a host is accomplished by transmitting a Device_Hail message, waiting for a Hail_Response message from a peripheral, and, upon the reception of a Hail_Response message, assigning a Peripheral Address to the responding peripheral and transmitting it to the peripheral in a Peripheral_Address_Allocation message.

10 Claims, 7 Drawing Sheets

DYNAMIC DISCOVERY OF WIRELESS PERIPHERALS

FIELD OF THE INVENTION

The present invention relates generally to processor-based computing systems, and more particularly to the use of wireless peripheral devices with a processor-based host computing device.

BACKGROUND INFORMATION

Peripheral devices (such as keyboards, joysticks, mice, etc.) for computers have traditionally been connected to host computing devices via communication cables. Data transfer between such "tethered" peripheral devices and their host computers is thus via the connecting cables. Recently, however, wireless peripheral devices have begun emerging. These new wireless peripheral devices communicate with their host computers via, e.g., high frequency (HF), radio frequency (RF), and infrared (IR) communication signals.

Before a wireless peripheral device can be used in conjunction with a particular processor-based host computer, a communication channel must be established between the peripheral and the host. Establishment of such a communication channel requires that the host detect the presence of the peripheral, and then "bind" the peripheral. The few wireless peripheral devices currently available require a cumbersome manual binding technique between the peripheral and the host, whereby a user, via a tethered peripheral device (such as a keyboard), manually notifies the host of the presence of the wireless peripheral and initiates the binding process.

SUMMARY OF THE INVENTION

Embodiments of the present invention provide a "Plug and Play" type dynamic detection and binding capability for wireless peripheral devices. The present dynamic detection and binding capability is accomplished without manual intervention, and without modifications to the host computing device's built-in operating system (BIOS).

According to the present invention, dynamic detection and binding of a wireless peripheral device by a host is accomplished by transmitting a Device_Hail message, waiting for a Hail_Response message from a peripheral, and upon the reception of such a Hail_Response message, assigning a Peripheral Address to the responding peripheral and transmitting it to the peripheral in a Peripheral_Address_Allocation message.

DETAILED DESCRIPTION

Embodiments of the present invention can be used with a variety of wireless peripheral device technologies, including, for example, high frequency (HF), radio frequency (RF), and infrared (IR) peripherals. For illustrative purposes herein, wireless peripherals having IR transceivers and host computing devices supporting IR transceiver modules are discussed. This is solely by way of example and for purposes of explanation, and is not intended to limit the scope of the claims appended hereto.

Figure 1:
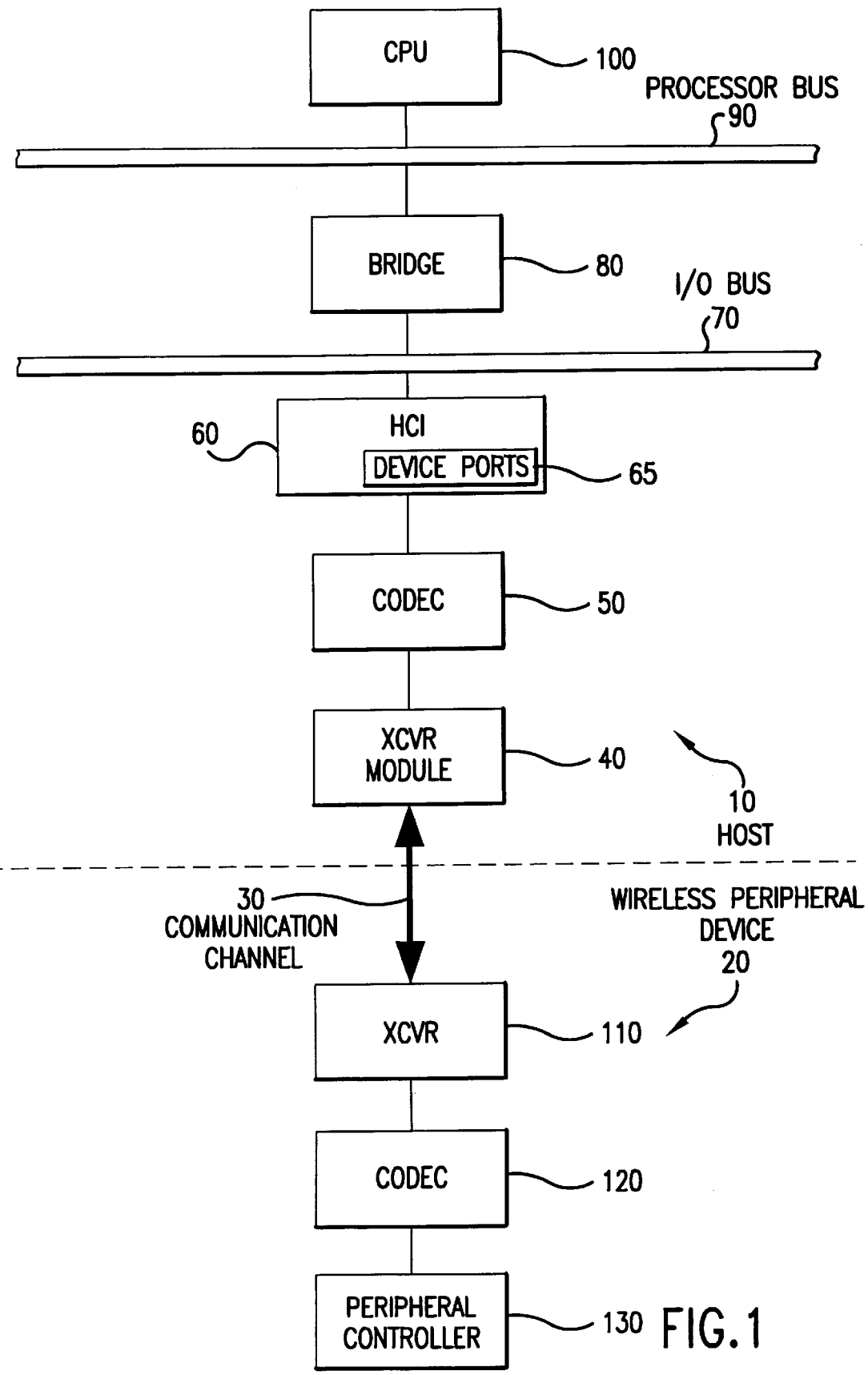
FIG. 1 is a functional block diagram depicting a host computer and wireless peripheral device according to one embodiment of the present invention.

FIG. 1 is a functional block diagram depicting a host computer 10 and wireless peripheral device 20 according to one embodiment of the present invention. The host 10 can be, for example, a personal computer (PC), while the wireless peripheral 20 can be, for example, a wireless keyboard, wireless mouse, or wireless joystick. In the illustrated embodiment of the present invention, the host 10 and wireless peripheral 20 communicate via infrared signals over a communication channel 30.

Within the host 10, the communication channel 30 is, according to one embodiment of the present invention, controlled by a host controller interface (HCI) 60, which manages the host's wireless peripheral ports 65, and the communications thereto and therefrom. Outgoing communications are encoded and incoming communications are decoded by an encoder/decoder (CODEC) 50, and are transmitted over and received from a communication channel 30 by a transceiver module 40.

The HCI 60 is connected to an I/O bus 70 (e.g., a universal serial bus (USB) or Peripheral Component Interface bus (PCI bus)), which is, in turn, connected via a bridge 80 to the host's processor bus 90 (which is, e.g., an Intel Pentium Pro® bus). The processor bus 90 carries data to and from the host's central processing unit (CPU) 100.

Within the wireless peripheral device 20, a peripheral controller 130 controls communication to and from the host 10. As in the host 10, the wireless peripheral 20 has a CODEC 120 for encoding/decoding communications to/from the host 10, and a transceiver for transmitting and receiving communications to/from the host 10.

In one embodiment of the present invention, the host's transceiver module 40 is an IR transceiver module, and the peripheral's transceiver 110 is an IR transceiver. In this embodiment, the communication channel 30 is an IR channel, over which IR signals are sent by the host 10 and peripheral 20.

Before a particular wireless peripheral device 20 can be used in conjunction with a particular host 10, a communication link must be established between them. Establishment of such a link requires, first, that the host 10 be made aware of the presence of the peripheral 20 within the host's operating environment. In addition, because communication between a host 10 and a wireless peripheral 20 occurs via electromagnetic signals sent through the air rather than through a physical cable connecting the devices, and because there may be other hosts 10 and/or peripherals 20 operating within the signal detection range of the two devices, the host 10 and the wireless peripheral 20 must have a unique means of identifying each other. Such an identification mechanism allows the peripheral 20 to distinguish communication signals sent by the host 10 from signals sent by other hosts 10 which may be operating within the peripheral's signal detection range, and allows the host 10 to distinguish communication signals sent by the peripheral 20 from signals sent by other peripherals 20 operating within the host's signal detection range.

These two requirements for the establishment of a communication link between a host 10 and wireless peripheral device 20 are referred to herein as, respectively, "detection" and "binding." Thus, the host 10 must first detect the presence of a wireless peripheral 20, and then bind that peripheral 20 to it. The detection and binding of wireless peripheral devices 20 by a host 10 is sometimes referred to herein as "device discovery."

Figure 2:
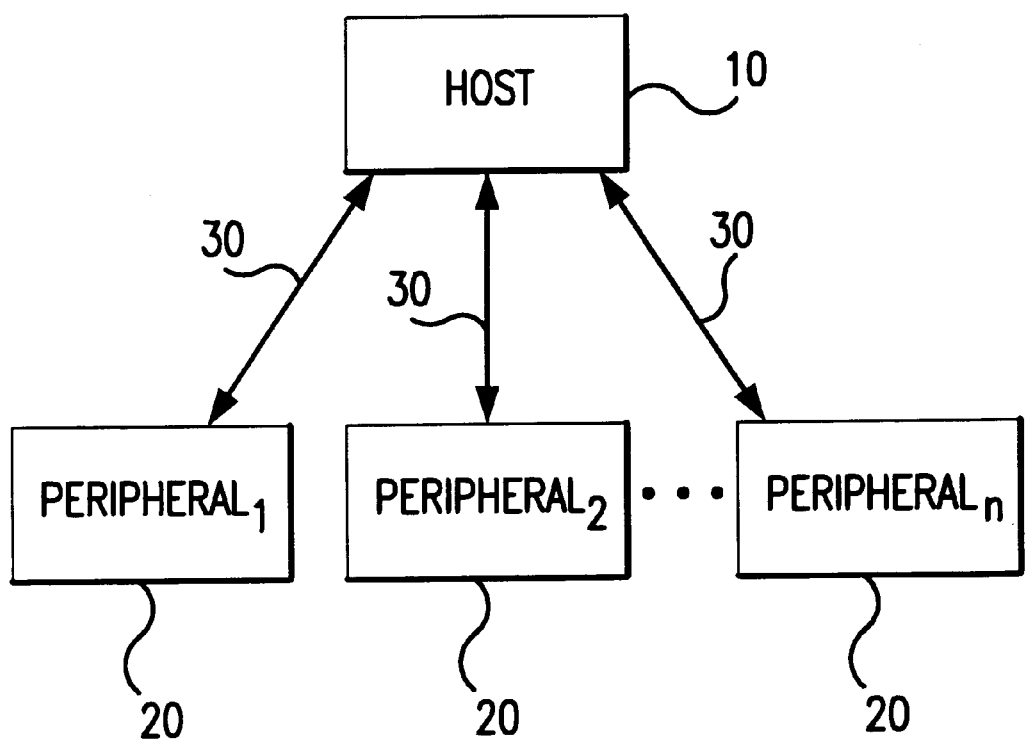
FIG. 2 is a block diagram of a host bound to a plurality of wireless peripheral devices.

A particular host 10 may, at any given time, have communication links established with a plurality of wireless peripheral devices 20. That is, the host 10 may be simultaneously bound to a number of wireless peripheral devices 20, with the maximum number being equal to the number of wireless peripheral ports 65 the host 10 is configured to support. FIG. 2 depicts a block diagram of a host 10 bound to a plurality of wireless peripheral devices 20, i.e., a host 10 with communication links 30 established with a plurality of wireless peripheral devices 20.

Figure 3:
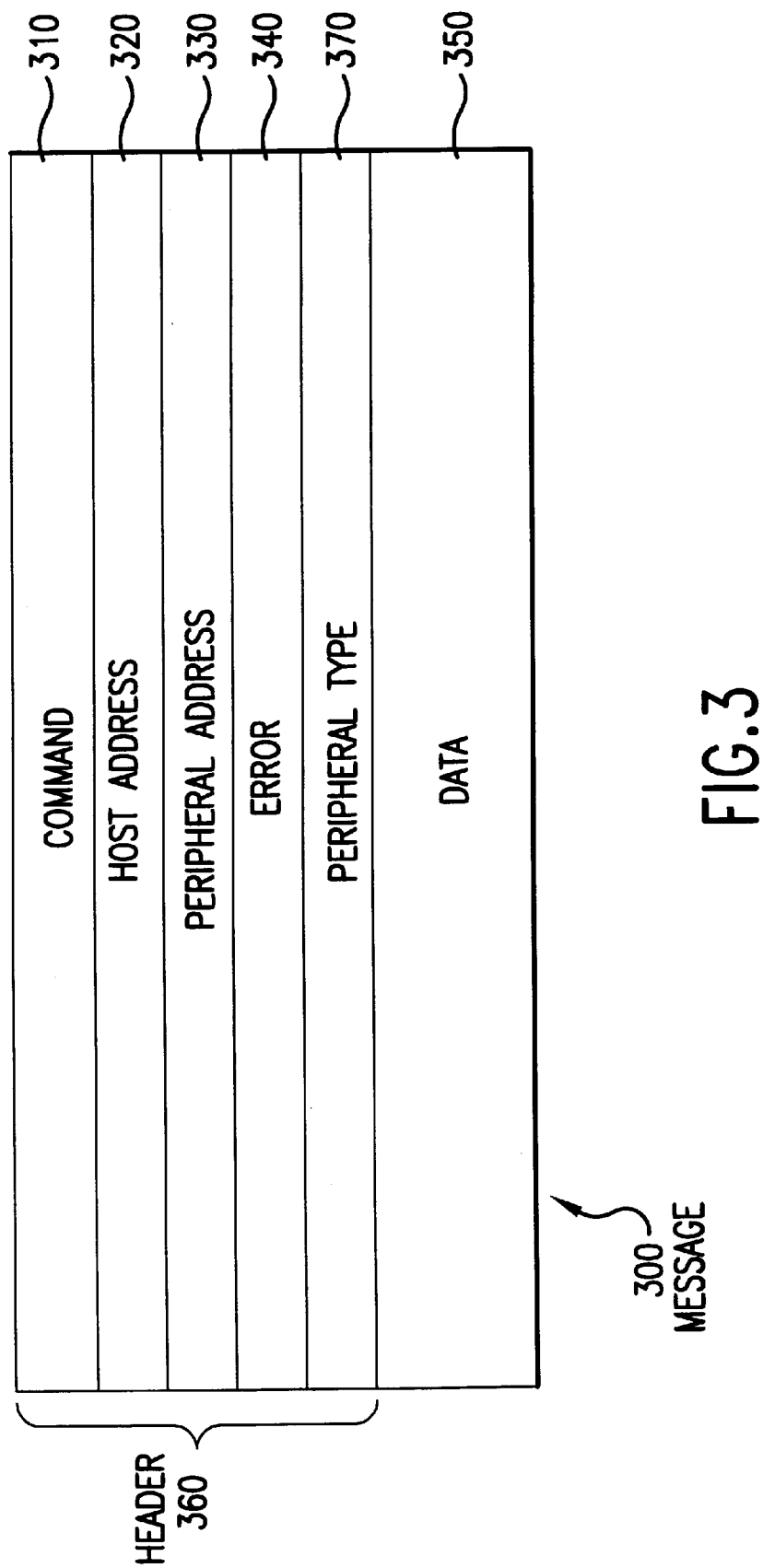
FIG. 3 depicts the message data structure for communications between a host computing device and wireless peripheral device according to one embodiment of the present invention.

FIG. 3 depicts a message 300 data structure for communications between a host device 10 and wireless peripheral 20 according to one embodiment of the present invention. Each message 300 sent between a host 10 and peripheral 20, according to this embodiment, contains a header 360 and data 350. Messages 300 according to the present invention can be configured such that the data 350 portion has a fixed or variable length.

The message header 360 includes a Host Address 320 field. The Host Address 320 value is generated, during a host's power-on sequence, each time the host device 10 is reset (i.e., powered on, rebooted, etc.). The Host Address 320 serves as the host identifier in all subsequent communications (i.e., in all messages 300 sent) between the host 10 and its wireless peripherals 20. When the host 10 is next reset, a new Host Address 320 value is generated, and it becomes the current host identifier. According to one embodiment of the present invention, the Host Address 320 is an 8-bit data field, the most significant bit of which is used to distinguish a Human Interface Device (HID) based host 10 from a consumer appliance based host (such as, e.g., a television with remote control, a microwave, etc.).

The message header 360 also includes a Peripheral Address 330 value. Each time a wireless peripheral device 20 is reset (e.g., powered on), it creates a Peripheral ID, to distinguish itself from other wireless peripheral devices 20 which may be operating in the same host environment. According to one embodiment, the Peripheral ID is a 16-bit identifier. While the Peripheral ID could be used in each message 300 to uniquely identify a particular wireless peripheral 20, a shortened peripheral device 20 identifier may be desirable, since the shorter the message header 360, the less battery power is consumed by the peripheral device 20 in sending and receiving messages 300. Accordingly, in one embodiment of the present invention, a smaller (e.g., 4-bit) Peripheral Address 330 field is used in the message header 360 to uniquely identify a particular wireless peripheral device 20 bound to a host 10.

The message header 360 also includes a Command 310 field. The Command 310 field identifies the type of a particular message 300, and thus the nature of the information included in the data 350 portion of the message 300. The various message types (and thus the various values for the Command 310 field) are discussed below, and are summarized in FIG. 7.

The message header 360 also contains an Error 340 field. According to one embodiment of the present invention, the Error 340 field is a single bit which, if set, indicates a collision and/or conflict between wireless peripheral devices 20. Peripheral collisions and conflicts, and the resolutions thereof, are discussed in greater detail below.

Also included in the message header 360 is a Peripheral Type 370 field. The Peripheral Type 370 field indicates the nature of a particular peripheral device 20 (e.g., keyboard, mouse, joystick, etc.). In wireless systems which employ the HID standard, this field is referred to as the Packet Type.

Embodiments of the present invention provide a dynamic detection and binding capability for wireless peripheral devices 20—i.e., a capability for wireless peripheral detection and binding that does not require manual intervention by a user.

When a host 10 is powered off or reset, any communication links 30 which the host 10 had previously established with wireless peripherals 20 are no longer available. These links must thus be reestablished by the host 10 after the conclusion of, or as a part of, its power-on/reset sequence. Detection of wireless peripheral devices 20 with active transceivers within the host's operating environment is accomplished by the transmission of Device_Hail messages by the host 10 and the subsequent response(s) by any peripheral device(s) 20 which desire to bind to the host 10.

Figure 4:
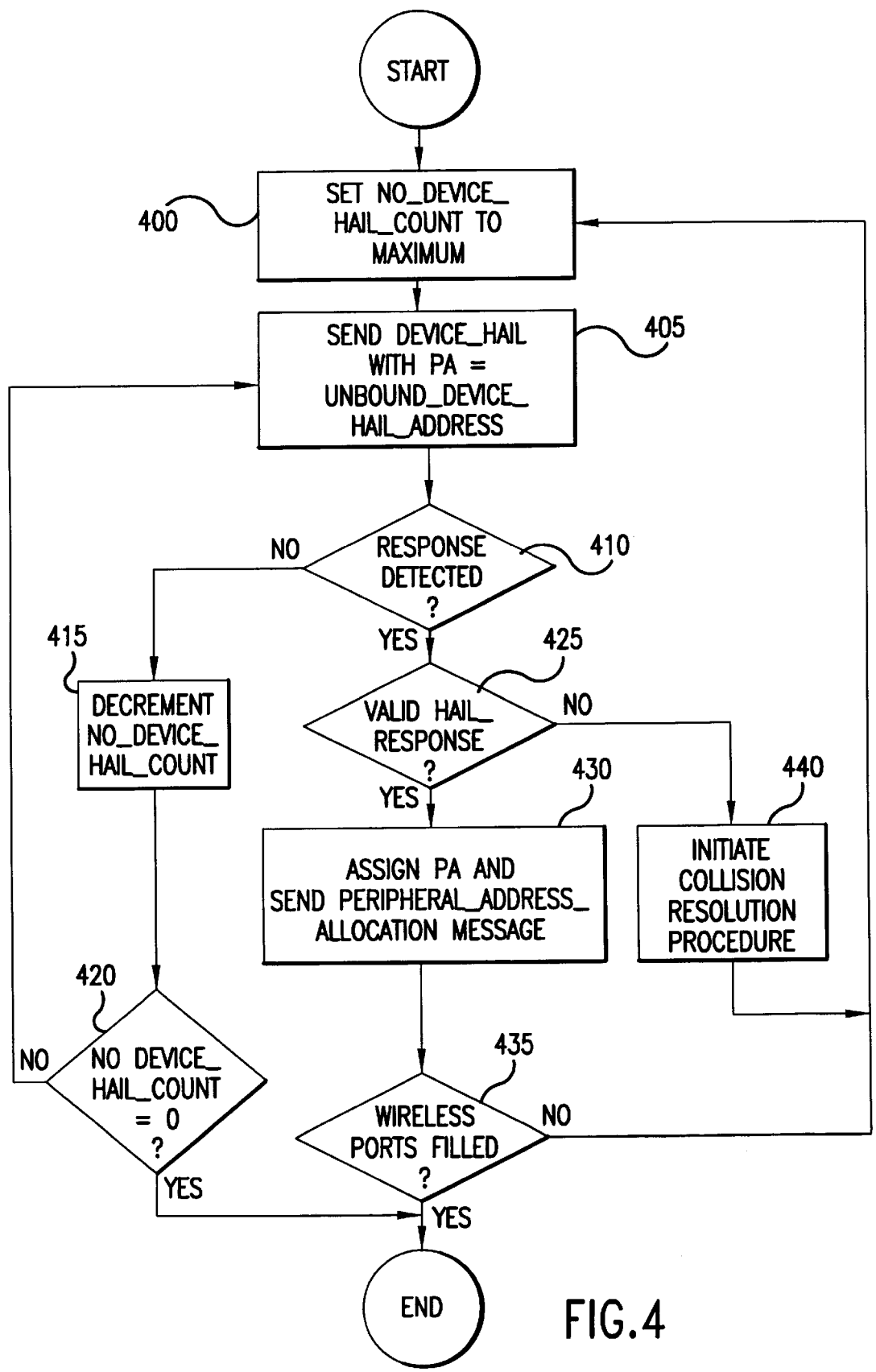
FIG. 4 is a flowchart depicting device discovery following a host system reset according to one embodiment of the present invention.

FIG. 4 is a flowchart depicting the device discovery procedures carried out by the HCI 60 following a host system reset according to one embodiment of the present invention. At the beginning of this reset device discovery sequence, the HCI 60 begins by setting a No_Device_Hail_Count parameter to a predetermined maximum value (step 400). The No_Device_Hail_Count parameter keeps track of the consecutive number of unresponded to Device_Hail messages sent out by the host 10. Once the desired maximum consecutive number of unresponded to Device_Hail messages have been sent (i.e., once the No_Device_Hail_Count value reaches zero), it is assumed by the host 10 that all active wireless peripherals 20 within the host's operating environment have been detected and bound. During this reset device discovery sequence, the No_Device_Hail_Count is reset to its maximum value every time a valid response by a peripheral 20 to a Device_Hail message is detected.

Following setting of the No_Device_Hail_Count to its maximum value, the host 10 sends (via, e.g., an infrared transceiver) a Device_Hail message (step 405). The Command 310 field in the message is set to indicate that the message type is a Device_Hail, and the Host Address 320 is set to the current Host Address 320 value. If no peripheral "collision" (see discussion below) was detected in response to the previous Device_Hail message sent by the host 10, the Error 340 field value is set to indicate a "no error" status, otherwise the Error 340 field is set to an "error" status. If the Error 340 field in a particular Device_Hail message is set to indicate an error condition, no peripherals 20 will respond to that Device_Hail (see peripheral collision resolution discussion, below).

The Peripheral Address 330 field in the Device_Hail message is set to an Unbound_Device_Hail_Address value, which indicates to any wireless peripherals 20 which receive the Device_Hail message that the host 10 is attempting to detect and bind to any wireless peripherals 20 which are currently unbound.

Once the Device_Hail message is transmitted, the HCI 60 checks for a response (step 410). If no response is detected, the HCI 60 decrements the No_Device_Hail_Count (step 415). If the resultant No_Device_Hail_Count value is zero (step 420), the reset device discovery process is concluded. If the No_Device_Hail_Count value is not zero (step 420), the host 10 transmits another Device_Hail message (step 405).

If a response message was detected in step 410, the host 10 determines whether the response is a valid Hail_Response message (step 425). If more than one wireless peripheral 20 attempts to respond to the same Device_Hail message, the host 10 will be able to determine from the signal it receives that there has been a peripheral "collision" —i.e., that two or more peripherals 20 are attempting to communicate simultaneously with the host 10, and their messages have collided.

Figure 5:
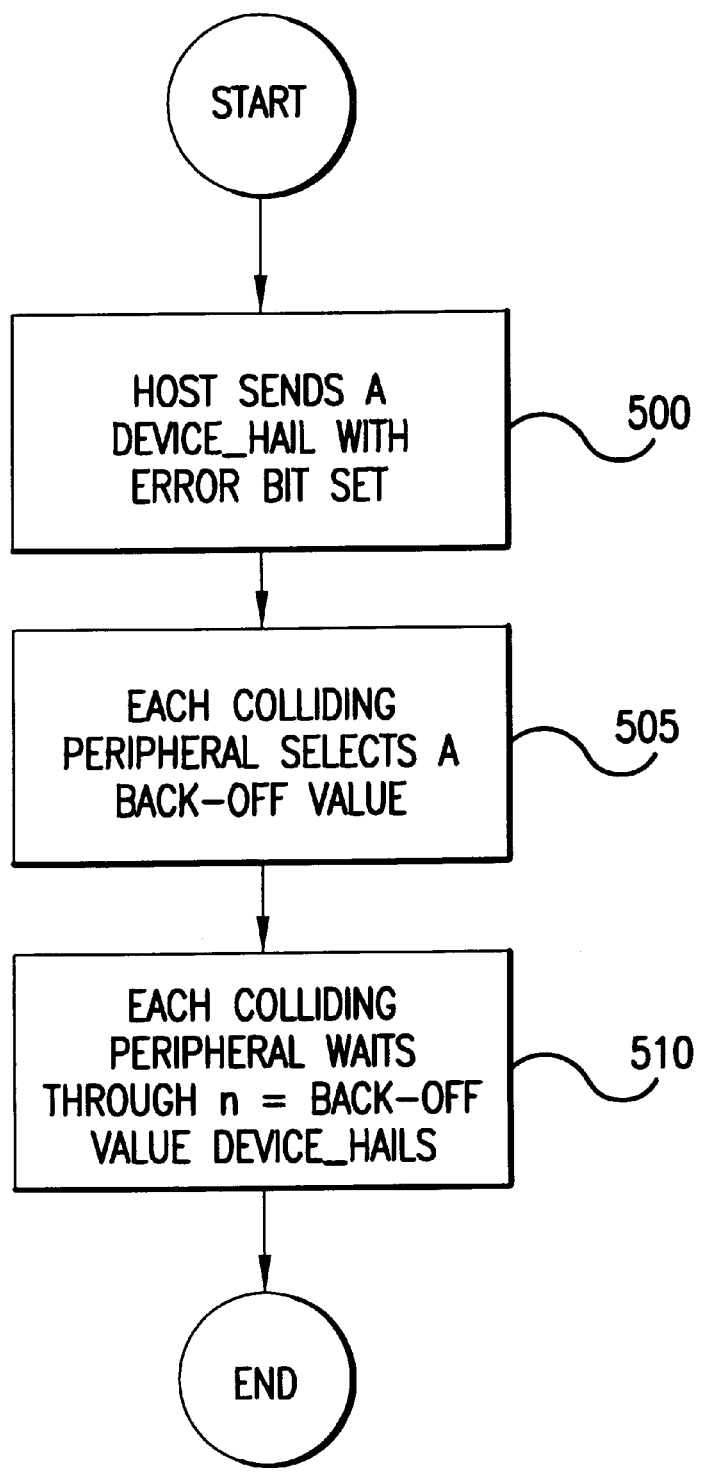
FIG. 5 is a flowchart which depicts a collision resolution procedure according to one embodiment of the present invention.

If a collision is detected (i.e., the host 10 receives an invalid message in response to its Device_Hail) (step 425), the host 10 (via, e.g., the HCI 60) initiates a collision resolution procedure (step 440). The collision resolution procedure is depicted in FIG. 5, and is discussed below.

If a valid Hail_Response message is received by the host 10 (i.e., if the host 10 "detects" a wireless peripheral 20 within its operating environment) (step 425), the host 10 assigns a Peripheral Address 330 number to the responding peripheral 20 (as identified by the Peripheral ID transmitted in the data field of the received Hail_Response message) and transmits a Peripheral_Address_Allocation message which includes the Host Address 320, newly-assigned Peripheral Address 330 and the Peripheral ID of the peripheral 20 being bound (step 430). The peripheral 20 which sent the Hail_Response will, upon receiving the Peripheral_Address_Allocation message with its Peripheral ID, store its new Peripheral Address 330. The responding peripheral 20 and the host 10, each having a unique identifier for the other (the Host Address 320 and the Peripheral Address 330, respectively), will then be "bound," i.e., a communication link will have been established between them.

After sending the Peripheral_Address_Allocation message (step 430), the HCI 60 determines whether all of the host's wireless device ports 65 have been allocated (step 435). If so, the host 10 terminates its reset device discovery process. If not, the HCI 60 resets the No_Device_Hail_Count to its maximum (step 400), and continues its attempt to detect and bind other wireless peripherals 20.

The reset device discovery sequence depicted in FIG. 4 should serve to detect and bind all previously-unbound wireless peripherals 20 which, at the time the host 10 is reset, have their transceivers active and are within the host's operating environment. However, because there may be other unbound wireless peripherals 20 which enter a host's operating environment at a subsequent time (e.g., peripherals 20 which were previously being used with another host 10), and/or there may be peripherals 20 which were in a "sleep" (or low power) state at the time the host 10 was reset, but which subsequently became active, it is necessary that the host 10 periodically perform device discovery operations (i.e., send Device_Hails, check for Hail_Responses, etc.) during its normal (i.e., post-reset) operations.

As indicated above, it is possible that more than one peripheral 20 may attempt to respond to the same Device_Hail message from a particular host 10. In the case of such a "collision," the host 10 must notify the peripherals 20 of the error, and initiate a collision resolution procedure. FIG. 5 is a flowchart which depicts a collision resolution procedure according to one embodiment of the present invention.

If a collision is detected by a host 10 following a Device_Hail message (see FIG. 4, steps 425, 440), the host 10 sends a new Device_Hail message, with the Error 340 field set to indicate an error condition (step 500). Each of the peripherals 20 which responded to the previous Device_Hail will expect a Peripheral_Address_Allocation message from the host 10, but will, upon seeing the Device_Hail with error condition indication, realize that they have been involved in a collision. Each of the colliding peripherals 20 will then randomly select a "back-off" value (step 505). In one embodiment of the present invention, the back-off value can be any integer between zero and 15.

Each of the colliding peripherals 20 then waits, without responding, through n Device_Hail messages from the host 10, where n is equal to the back-off value for that peripheral 20 (step 510). Ideally, each colliding peripheral 20 will have chosen a different back-off value and thus, in its next attempt to bind to the host 10, respond to a different Device_Hail message than the other colliding peripherals 20. The range of back-off values should be chosen such that there is a low probability that two peripherals 20 will randomly choose the same back-off value, but also such that the binding of the colliding peripherals 20 is not extensively delayed.

After the host's reset device discovery operations are completed, the host 10 enters a polling mode, which continues throughout the host's normal operations. While in the polling mode, the host 10 periodically sends out Device_Poll messages to each of its bound peripherals 20. If a particular peripheral 20 has data it wishes to transmit to the host 10, it does so in a Poll_Data_Response message, sent in reply to a Device_Poll message addressed to the peripheral 20 (i.e., a Device_Poll message containing the Peripheral Address 330 of the peripheral 20) from the host 10.

As discussed above, the host 10 will periodically send Device_Hail messages while in its normal operating (i.e., its polling) mode, in order to detect and bind any unbound, active peripherals 20 within the host's operating environment. As with the device discovery performed by the host 10 upon reset, if a peripheral collision occurs in response to one of the periodic Device_Hail messages, a collision resolution procedure (as depicted in FIG. 5 and discussed above) will be initiated by the host 10.

Figure 6:
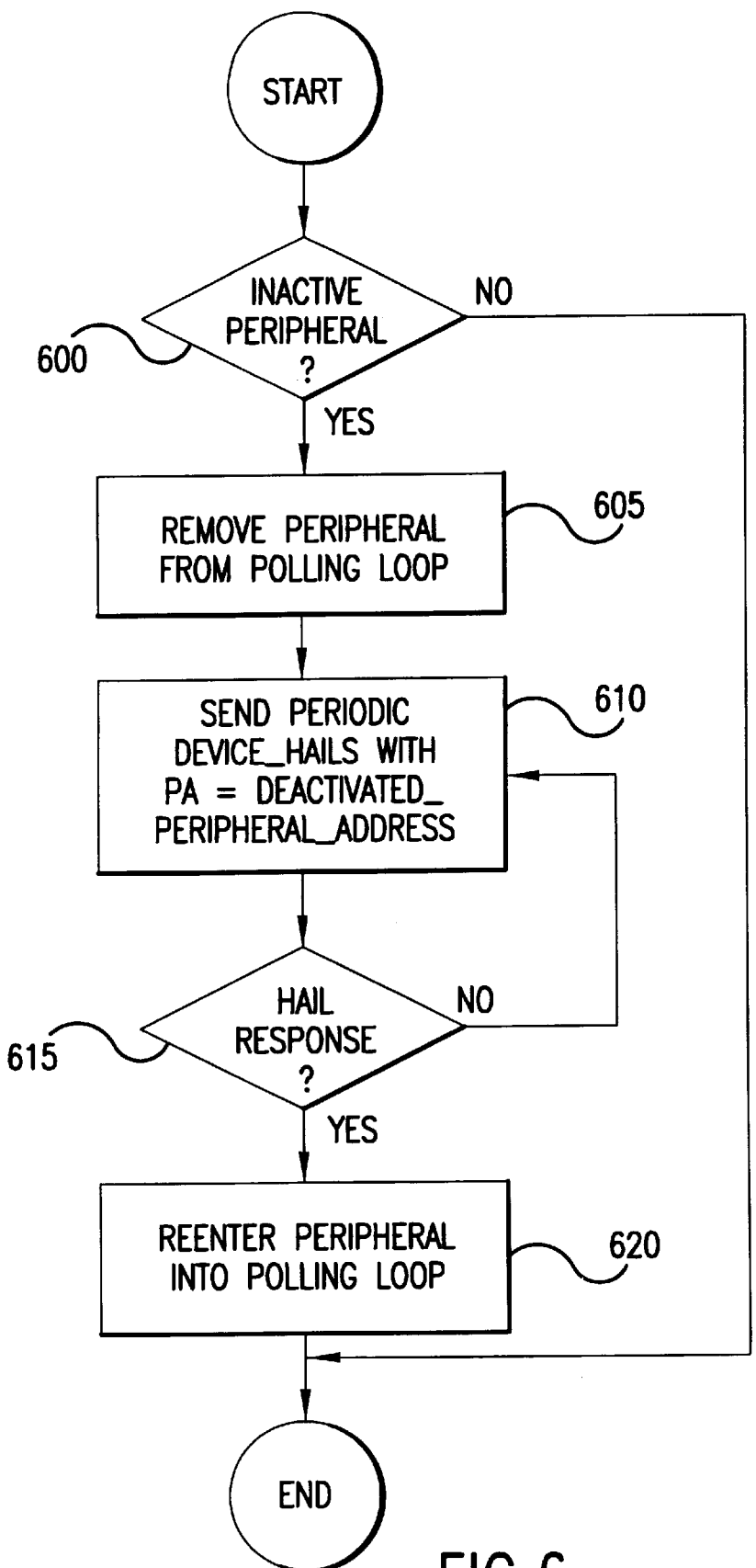
FIG. 6 is a flowchart depicting the deactivation and reactivation of a bound peripheral by a host according to one embodiment of the present invention.

FIG. 6 is a flowchart depicting the deactivation and reactivation of a bound peripheral 20 by a host 10 according to one embodiment of the present invention. If a bound peripheral 20 becomes inactive (step 600) (i.e., fails to respond to some predetermined number of consecutive Device_Poll messages from the host 10), the host 10 may choose to remove the peripheral 20 from the host's polling loop (step 605). A bound peripheral 20 which has been removed from a host's polling loop is considered "deactivated."

Once a peripheral 20 has been deactivated, no Device_Poll messages will be addressed to it. Thus, a deactivated peripheral 20 that wishes to send data to its host 10 will realize that it has been deactivated when it detects that polling by the host 10 is occurring (i.e., a host 10 is transmitting Device_Poll messages with the Host Address 320 expected by the peripheral 20 in the message header), but that none of the Device_Polls are addressed to that particular peripheral 20. Once a host 10 has deactivated one or more peripherals 20, the host 10 will, in addition to its usual periodic Device_Hail messages, send a second type of Device_Hail message (step 610). In this second type of Device_Hail, the Peripheral Address 330 is set to a Deactivated_Peripheral_Address value, rather than the Unbound_Device_Hail Address value used in the usual Device_Hail messages. Response by a peripheral 20 to a Device_Hail in which the Peripheral Address 330 is set to the Deactivated_Peripheral_Address value, rather than the Unbound_Device_Hail_Address value, signals the host 10 that the peripheral 20 has previously been bound to the host 10, and thus that the configuration, etc. data for the peripheral 20 are already stored within the host device 10.

In one embodiment of the present invention, if a peripheral 20 that is waiting for a Device_Poll with its Peripheral Address 330 from its host 10 detects, prior to receiving such a Device_Poll, two Device_Hails with the Peripheral Address 330 set to the Deactivated_Peripheral_Address value, the peripheral 20 will consider itself deactivated.

In order to become reactivated (i.e., reentered into the host's polling loop), a peripheral 20 that realizes it has been deactivated will wait for and respond to a Device_Hail from the host 10 in which the Peripheral Address 330 is set to the Deactivated_Peripheral_Address value. Upon receiving a Hail_Response from the Peripheral following such a Device_Hail (step 615), the host 10 will reenter the peripheral 20 into its polling loop (step 620).

While a peripheral 20 is deactivated, the host 10 may (due to, e.g., a shortage of available peripheral device ports 65), bind another peripheral 20 to the same Peripheral Address 330 as was assigned to the deactivated peripheral 20. Because the host 10 will then resume transmission of Device_Poll messages containing that particular Peripheral Address 330, the deactivated peripheral 20 may not realize it has been deactivated and may, at some point, attempt to respond to a Device_Poll from the host 10.

If the deactivated peripheral 20 and the new peripheral 20 are of the same Peripheral Type 370 (e.g., both are joysticks), then the peripherals 20 are, from the host's perspective, interchangeable. However, if both of these otherwise "interchangeable" peripherals 20 attempt to respond to the same Device_Poll message from the host 10, the host 10 will detect the conflict, and will initiate an unbinding of one of the peripherals 20.

The host 10 must first select which peripheral 20 it wants to remain bound. This selection can be based upon, e.g., which peripheral 20 was most recently active. The host 10 can then send an Allocate_Peripheral_Address message which includes the Peripheral ID of the selected peripheral 20 and the Peripheral Address 330 shared by the two (or more) conflicting peripherals 20. Each of the peripherals 20 which share that Peripheral Address 330 will detect the Allocate_Peripheral_Address message, and any which have a Peripheral ID that does not match the Peripheral ID in the message, will realize that they are no longer bound to the host 10. These peripherals 20 may subsequently rebind to the host 10 by responding to a Device_Hail command with a Peripheral Address 330 set to the Deactivated_Peripheral_Address value.

If the deactivated peripheral 20 and the new peripheral 20 which share a Peripheral Address 330 are not of the same Peripheral Type 370, then the host 10 will detect (from the incorrect Peripheral Type 370 field value) a conflict if the deactivated peripheral 20 sends a Poll_Data_Response in response to a Device_Poll from the host 10. The host 10 will detect such a conflict whether or not the deactivated peripheral 20 and the new peripheral 20 attempt to respond to the same Device_Poll message. The host 10 will then unbind the deactivated peripheral 20 by sending an Allocate_Peripheral_Address message, as described above.

There are a variety of circumstances in which a particular wireless peripheral 20 may believe it is bound to a host 10 other than the host 10 within whose operating environment the peripheral 20 is currently located. One such circumstance is when a peripheral 20 which was previously bound to another host 10 is relocated to the vicinity of a new host 10. Another such circumstance is if the host 10 to which a peripheral 20 was bound has subsequently been reset and has adopted a new Host Address 320.

In these situations, the peripheral 20 will not respond to Device_Hails, sent by the "new" host 10, in which the Peripheral Address 330 is set to the Unbound_Device_Hail_Address value, because the peripheral 20 believes it is already bound (although not to this particular host 10). The peripheral 20 will, rather, wait for a Device_Poll message from its host 10 so that it can transfer data.

If, before a valid Device_Poll message is detected by the peripheral 20, the peripheral 20 detects a Device_Hail message in which there is a "new" Host Address 320 (i.e., a Host Address 320 different than that assigned to the host 10 to which the peripheral 20 believes it is bound), the peripheral 20 will log this event. If a second such Device_Hail is detected by the peripheral 20, and the peripheral 20 has not, in the meantime, detected a Device_Poll directed to it or a Device_Hail from the "old" host 10, the peripheral 20 will, following this second Device_Hail (or a subsequent Device_Hail in which the Peripheral Address 330 is set to the Unbound_Device_Hail_Address value), send a Hail_Response to the new host 10. The host 10 will then bind the peripheral 20.

Many host computing devices 10 and wireless peripherals 20 are capable, during periods of inactivity, of entering a power-managed or "sleep" state. One embodiment of the present invention provides a capability for the "wake-up" of a host 10 by a peripheral 20. According to this embodiment, if a peripheral 20 does not detect any valid activity from a host 10 for a predetermined period of time, the peripheral 20 may assume that the host 10 is in a sleep state. The peripheral 20 may then issue a Host_Wakeup command (i.e., send a Host_Wakeup message). The Host_Wakeup command is unique in that it is not, unlike the other messages initiated by a peripheral 20, sent in response to a message from the host 10.

If a host 10 within the operating range of the peripheral 20 is in a sleep state, its wireless transceiver should detect the Host_Wakeup message and the host 10 should then resume its normal operations (including, e.g., its peripheral device polling sequence). If, after sending a Host Wakeup command, a peripheral 20 detects no activity from the host 10, the peripheral 20 may then assume the host 10 is no longer in service (e.g., it is powered off). The peripheral 20 can then enter a sleep state.

Figure 7:
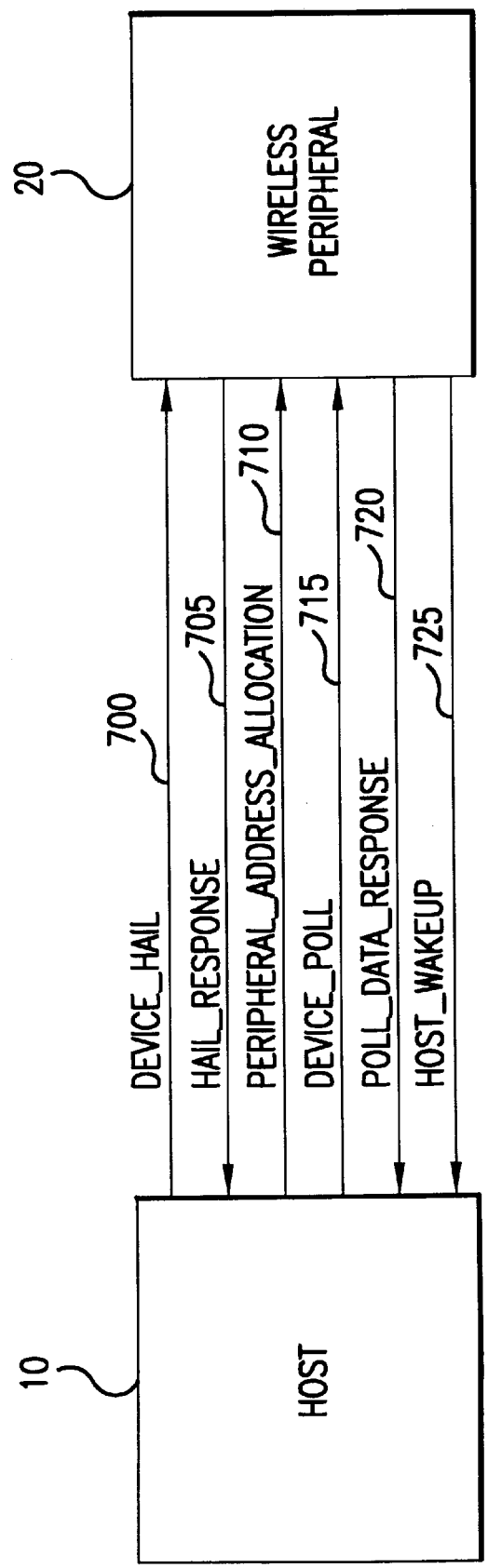
FIG. 7 summarizes the various message (or "command") types transmitted between a host and a peripheral according to the illustrated embodiment of the present invention.

FIG. 7 summarizes the various message (or "Command" 310) types transmitted between a host 10 and a peripheral 20 according to the illustrated embodiment of the present invention.

Embodiments of the present invention provide dynamic discovery (i.e., detection and binding) of wireless peripheral devices 20 by a host computing device 10. Device discovery according to embodiments of the present invention is managed by the HCI 60, and is thus transparent to the CPU. Accordingly, device discovery is achieved without changes to the host system's existing built-in operating system (BIOS).

Although various embodiments are specifically illustrated and described herein, it will be appreciated that modifications and variations of the present invention are covered by the above teachings and within the purview of the appended claims without departing from the spirit and intended scope of the invention. Such variations might include, for example, use of a different wireless communication technology (such as, e.g., RF or HF transceivers in the host 10 and peripheral devices 20).

What is claimed is:

1. A method for dynamic detection of a wireless peripheral device by a host, the method comprised of:
   a) transmission by the host of a Device_Hail message to the wireless peripheral device, said Device_Hail message comprising a host address that is generated when the host is reset; and
   b) reception by the host of a Hail_Response message from the wireless peripheral device, said Hail_Response message comprising a peripheral ID that is generated when the wireless peripheral device is reset, wherein the peripheral ID can change each time the wireless peripheral device is reset.

2. The method of claim 1, further comprising:
   c) assigning a peripheral address number to the wireless peripheral device at the host; and
   d) receiving and storing the peripheral address number at the wireless peripheral device.

3. A method for dynamic detection and binding of a wireless peripheral device by a host having a Host Address, the method comprised of:
   a) transmitting a Device_Hail message containing the Host Address to the wireless peripheral device, said Host Address being generated when the host is reset;
   b) receiving a Hail_Response message from the wireless peripheral device, said Hail_Response message comprising a peripheral ID that is generated when the wireless peripheral device is reset, wherein the peripheral ID can change each time the wireless peripheral device is reset;
   c) upon reception of the Hail_Response message from the wireless peripheral device, assigning a Peripheral Address to the wireless peripheral device and transmitting the Peripheral Address to the wireless peripheral device in a Peripheral_Address_Allocation message.

4. The method according to claim 3, wherein the method is performed following a powering on or resetting of the host.

5. The method according to claim 3, wherein the method is performed while the host is in a normal operating mode.

6. The computing system of claim 5, wherein said host computing device assigns a peripheral address number to the wireless peripheral device; and
   wherein said wireless peripheral device receives and stores the peripheral address number.

7. A wireless peripheral computing system, comprised of:
   a) a host computing device having:
      1) a host controller interface for generating a Device_Hail message and for processing a Hail_Response message, said Device_Hail message comprising a host address that is generated when the host computing device is reset; and
      2) a first transceiver coupled to the host controller interface for wireless transmission of the Device_Hail message and wireless reception of the Hail_Response message;
   b) a wireless peripheral device having:
      1) a peripheral controller for processing a Device_Hail message from the host and generating a Hail_Response message, said Hail_Response message comprising a peripheral ID that is generated when the wireless peripheral device is reset, wherein the peripheral ID can change each time the wireless peripheral device is reset; and
      2) a second transceiver coupled to the peripheral controller for wireless reception of the Device_Hail message and wireless transmission of the Hail_Response message.

8. The wireless peripheral computing system according to claim 7, wherein the host controller interface includes a plurality of wireless device ports.

9. The wireless peripheral computing system according to claim 7, wherein the host computing device further includes an encoder/decoder coupled between the host controller interface and the first transceiver, and wherein the wireless peripheral device further includes an encoder/decoder coupled between the peripheral controller and the second transceiver.

10. The wireless peripheral computing system according to claim 7, wherein the first transceiver is an infrared transceiver and the second transceiver is an infrared transceiver.

* * * * *